W. TUCKER.
Cross-Head and Other Slides.
No. 206,648.  Patented July 30, 1878.
Fig. 1.
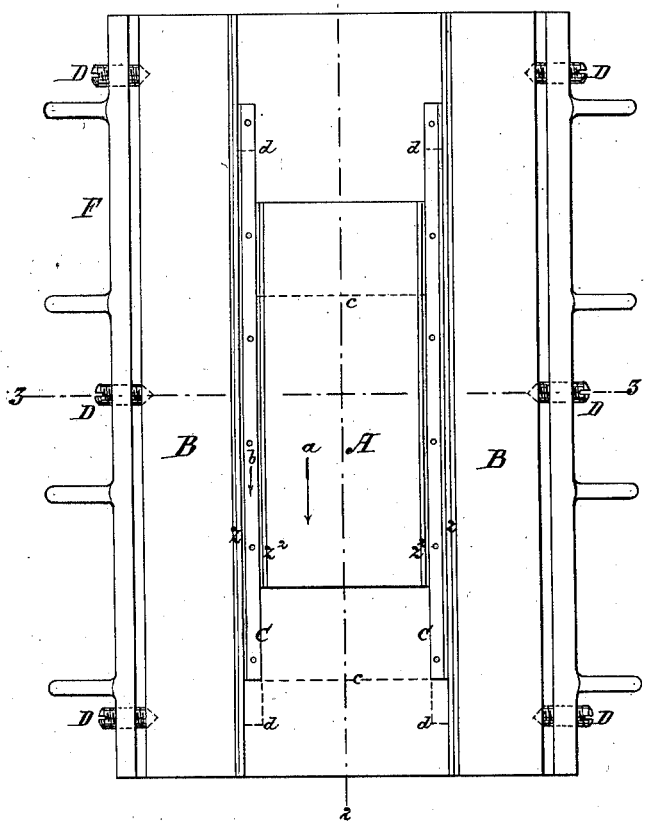
Fig. 2.
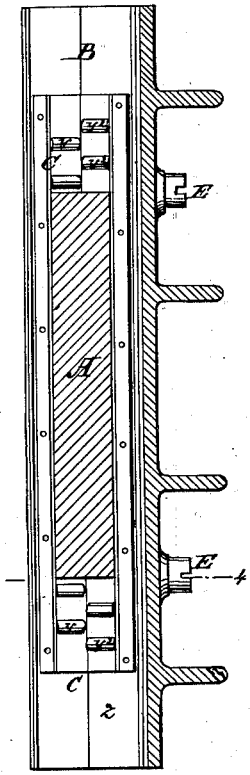
Fig. 3.
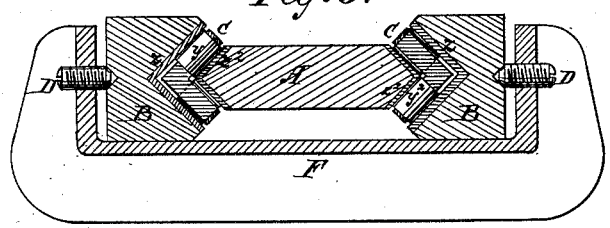
Fig. 4.
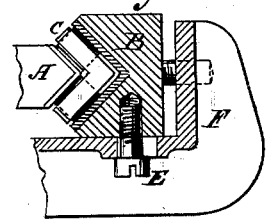
Fig. 5.
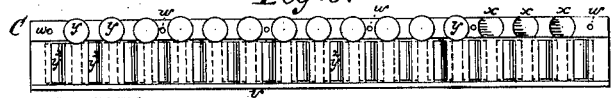
Figs. 6, 7.
WITNESSES
Cha⸱ Raettig
E. B. Bolton
INVENTOR.
William Tucker
By Knight Bros
Attorneys

UNITED STATES PATENT OFFICE.

WILLIAM TUCKER, OF EAST BROOKFIELD, ASSIGNOR OF ONE-HALF HIS RIGHT TO JOHN G. AVERY, OF SPENCER, MASSACHUSETTS.

IMPROVEMENT IN CROSS-HEADS AND OTHER SLIDES.

Specification forming part of Letters Patent No. 206,648, dated July 30, 1878; application filed April 5, 1878.

*To all whom it may concern:*

Be it known that I, WILLIAM TUCKER, of East Brookfield, in the county of Worcester, Massachusetts, have invented a new and useful Improvement in Cross-Heads and other Slides, of which the following is a full, clear, and exact specification:

This invention relates to anti-friction devices; and consists in a novel mode of applying friction-rollers to slides of every description as a substitute for lubrication.

My said invention consists, first, in the combination, with a slide and its guide or guides, of parallel facings of hardened metal, interposed solid journalless friction-rollers of like hardened metal, and a carrier having a socket or cell for each roller and supported out of contact with said facings by said rollers, said carrier operating to keep said rollers in proper position and to prevent their escape when the slide is out of contact therewith without affecting the contact of said rollers with said facings.

My said invention consists, secondly, in the combination of a slide and its guide or guides having angular faces, presenting two sets of parallel flat surfaces at each edge of the slide, series of cylindrical rollers interposed between said surfaces respectively, and a single carrier for the adjacent series of rollers at each edge of the slide, said carrier being conformed to said surfaces and supported between the same by said rollers, while the rollers of each carrier support the slide in two or more directions, and are retained in position by said carrier.

My said invention consists, thirdly, in a simple and efficient roller-carrier for angular slides made of V shape in cross-section, drilled from each edge to form alternating roller-sockets, and completed by thin cap-bars attached to said edges after the rollers are inserted, as hereinafter more fully set forth.

Figure 1 of the accompanying drawing is a face view of a slide and its guides provided with anti-friction devices, illustrating this invention. Fig. 2 is a longitudinal section on the line 2 2, Fig. 1. Fig. 3 is a transverse section on the line 3 3, Fig. 1. Fig. 4 is a partial transverse section on the line 4 4, Fig. 2. Fig. 5 is an edge view of one of the roller-carriers, illustrating its construction. Figs. 6 and 7 are detail views of one of the rollers.

Like letters of reference indicate corresponding parts in the several figures.

This invention in one or more of its parts is applicable to any slide; but it is particularly designed for cross-heads and other slides A, working between parallel guides B B.

In the illustration a pair of guides is shown adjustable within a strong frame, F, by means of screws E D, said frame being an iron casting of trough shape, stiffened by deep transverse flanges, and perforated to receive said screws. The screws E attach the guides to the back of the frame, and are tapped into the guides and pass through slots in the back of the frame, as shown in Fig. 4. The screws D are tapped into the sides of the frame, and operate to press the respective guides toward each other, so as to take up looseness and prevent rattling. Guides may be thus adjusted in any frame; or they may be cast on or otherwise rigidly attached for all the purposes of the present invention. They may also be horizontal, vertical, or inclined, according to convenience, and in length, distance apart, and dimensions generally they may be of any required size. The longitudinal lines of the opposite faces of the guides must, however, be perfectly parallel, and I provide the same with smooth facings $z\ z$, of hardened steel or its equivalent, which may be formed on or attached to the iron in any approved way. I have attached them by rivets; but they may be formed by case-hardening, welding, and other processes. The longitudinal lines of the opposite edges of the slide must also be perfectly parallel, and these are provided with like smooth facings $z^2\ z^2$, of hardened steel or its equivalent. Between said hardened facings $z$ $z^2$, at each of the edges of the slide, a carrier, C, is accommodated, containing friction-rollers $y$ $y^2$, of like hardened metal, each of which is in solid contact with both of said facings, with its axis at right angles to the line of sliding motion and free to rotate.

The rollers are kept in place by the carriers, and, in turn, support the carriers out of contact with the said facings, while said rollers, in combination with said facings, preclude friction between the slide and its guides by providing a durable rolling medium between them.

The motion of the carriers C is with the slide A, but in either given direction the motion of the former is only half that of the latter, owing to the difference between the motion of the axes and the peripheries of the rollers. This is illustrated by arrows $a$ $b$ and dotted lines $c$ $d$ in Fig. 1. There being two series of rollers, $y$ $y^2$, at each edge of the slide in the illustration, they are so located as to alternate, as shown in Fig. 2.

The edges of the slide and the matching-faces of the guides, with their facings $z$ $z^2$, are made of V shape, as shown in Figs. 3 and 4, so as to cause the rollers to support the slide against motion in every direction, except longitudinal motion, without obstructing the face of the slide. The carriers are made of corresponding shape, and the two series of rollers of each carrier are accommodated in its respective flat portions.

The method of constructing the carriers C is illustrated in Fig. 5. A bar of the proper shape and dimensions is first made by casting or rolling, and its longitudinal edges are planed, drilled to form roller-sockets $x$ $x$, and provided with rivet-studs $w$ $w$, as represented. A sufficient number of solid cylindrical rollers $y$ $y^2$, Figs. 6 and 7, are provided, and inserted in the sockets $x$, which are drilled to fit them, each roller projecting a slight distance beyond both main surfaces of its carrier. Thin cap-bars $v$ $v$ are now attached by the rivet-studs $w$ or their equivalents, and this completes the carriers, which are thus adapted to be manufactured and supplied with their rollers with the utmost facility.

To reduce the slight friction between the rollers and the walls of their sockets, the carriers may, in some cases, be made of anti-friction material.

The V-shaped surfaces of slide and guides are not claimed as new, in themselves considered; nor are they considered essential to the invention as applied to slides working between parallel guides. Vertical rollers at the edges and horizontal rollers at bottom may, in some cases, be preferable for horizontal slides, and any preferred arrangement may be employed. Neither is it essential that when two or more series of rollers are united at one edge they shall be at right angles to each other, as in the illustration. With V-shaped surfaces a more acute or a more obtuse angle may be adopted, if preferred.

The solid journalless form of the rollers and the socketed form of the carrier are not claimed, *per se*, as part of the present invention; but said features are essential and important elements of the first part of this invention, friction-rollers being old in otherwise like combinations applied to slide-valves.

By entirely avoiding the employment of journals I insure the solid contact of each roller with the coacting surfaces without frictional restraint, while at the same time my rollers are adapted to be readily inserted altogether, and are kept out of contact with each other and in the proper positions for the most effective work. The solid form of the rollers, with the hardening of all the coacting surfaces, is likewise considered essential to success, these features serving together to prevent detrusion or indentation, which would be alike fatal in either surface.

The following is what I claim as new and of my own invention, and desire to secure by Letters Patent, namely:

1. The combination of a slide and its guide or guides having parallel facings of hardened metal, an interposed series of solid journalless friction-rollers of like hardened metal, and a carrier having a socket or cell for each roller and supported out of contact with said facing by said rollers, substantially as herein described.

2. The combination of a slide and its guide or guides having angular faces, presenting two sets of parallel flat surfaces at each edge of the slide, with series of cylindrical rollers interposed between said surfaces, respectively, and a single carrier for the adjacent series of rollers at each edge of the slide, substantially as herein specified.

3. A roller-carrier for angular slides made of V shape in cross-section, with roller-sockets in each edge, the rollers being retained in said sockets by cap-bars attached to said edges, substantially as herein shown and described, for the purpose set forth.

WILLIAM TUCKER.

Witnesses:
SAMUEL D. COLE,
HENRY L. WHEELOCK.